Jan. 7, 1964      J. E. ROSS      3,117,024
DETECTION OF EVAPORANT TEMPERATURE
Filed July 31, 1961
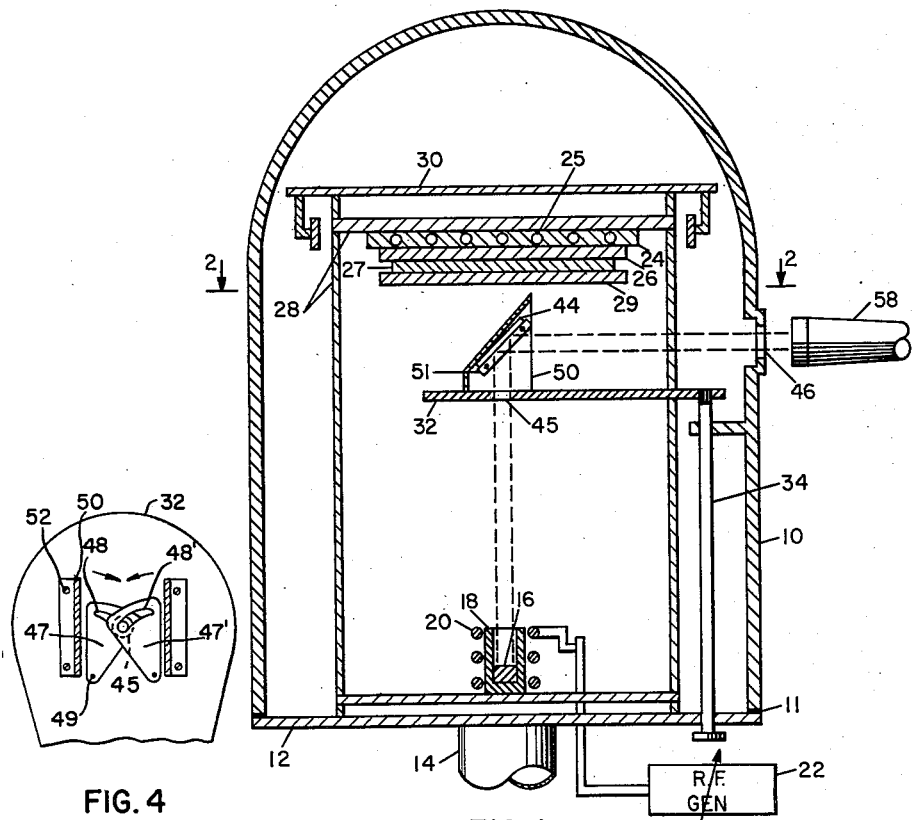
FIG. 1
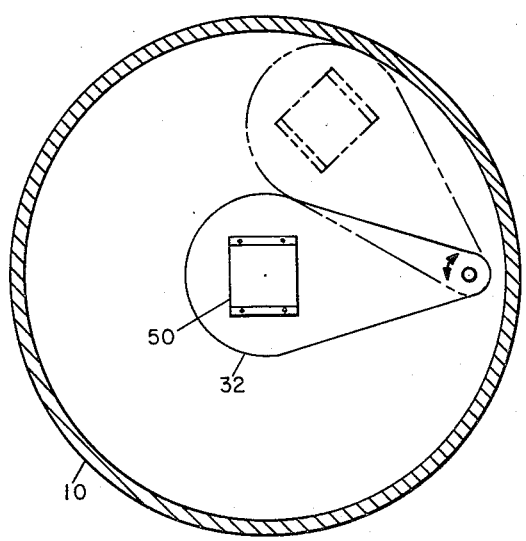
FIG. 4
FIG. 2
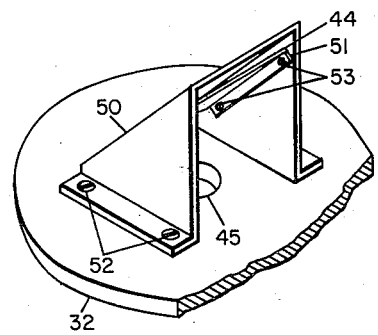
FIG. 3
INVENTOR
JACK E. ROSS
BY *Herbert F. Somenmeyer*
ATTORNEY

United States Patent Office 3,117,024
Patented Jan. 7, 1964

3,117,024
DETECTION OF EVAPORANT TEMPERATURE
Jack Edwards Ross, St. Paul, Minn., assignor to Sperry Rand Corporation, New York, N.Y., a corporation of Delaware
Filed July 31, 1961, Ser. No. 128,252
16 Claims. (Cl. 118—49)

This invention relates generally to apparatus employed in the evaporative fabrication of thin, magnetically bistable metal films, and more specifically to that portion of the apparatus used to determine the temperature of the molten source material.

Thin films are well known in the art and one technique for fabricating such thin films in a vacuum is taught in the U.S. Patent 2,900,282, issued to S. M. Rubens. To successfully employ the magnetic characteristics of thin, ferromagnetic films, for example, as memory elements in a computer device, it is necessary that each film or element exhibit the same characteristics or magnetic properties. It is well known that the temperature of the melt or source material at the time of deposition is a factor influencing the magnetic properties of the deposited material. Therefore, to develop uniform magnetic properties, each thin film or array of films should be formed when the source material is at a predetermined specific temperature. In order that this specific temperature be the same from one run or operation to the next, it is necessary that suitable apparatus be provided for accurately measuring the source material temperature.

The temperature of a heated object is directly related to the total amount of energy radiated by the object. Thus the temperature of the heated source material or melt has been measured by comparing the light as radiant energy emitted by the source material with light emitted from a previously calibrated heated wire filament. By the term radiant energy as it is used herein is meant that portion of the electro-magnetic radiation spectrum within the visible range including portions adjacent thereto, this being the energy characteristically emitted by heated bodies such as molten metal and the like. In the present apparatus a brightness or optical pyrometer is used to observe and compare the emitted radiant energies. However, the pyrometer is sensitive to all radiant energy falling within its field of observation and since there are other heated objects falling within the view field, for example, the container which holds the heated material, the total observed radiant energy may not be indicative of the true source temperature. Among the factors falling within the pyrometer's field of view which affect the resultant observed radiant energy are the specific materials composing the melt, surface condition of the melt, and heated objects adjacent the melt material.

Because of the influence of stray energy radiation from the variable factors mentioned above, it has not been possible to determine accurately the true temperature of the melt through the use of an optical pyrometer. Deposition, therefore, was necessarily allowed to occur over a relatively broad temperature range and much reliance was placed on the experience of the operator. Consequently, films were deposited at different melt temperatures and exhibited varied magnetic characteristics.

It is therefore an object of this invention to provide an improved means for accurately determining the true temperature of a source material by obviating factors distorting radiant energy measurement, thus improving the uniformity of magnetic characteristics of thin, magnetically bistable films.

It is also an object of this invention to provide improved means for ascertaining the temperature of a source material without impeding the evaporant path.

It is a further object of this invention to reduce the degree of experience and skill required of an operator employed to fabricate thin films.

A still further object is to provide a means for ascertaining the temperature of a source material which means cooperates with standard temperature sensing devices and is simple in design, cheaply constructed, accurate in response, and easily maintained.

In accord with one aspect of the present invention, the foregoing objects are accomplished generally by using an apertured shutter member, located above the melt, as a supporting device for a reflecting or mirror member. Ideally the mirror is located at the intersection of a vertical axis passing through the center of the melt with an axis parallel to the melt surface and passing longitudinally through the center of the pyrometer. The mirror is angularly disposed above the aperture of the shutter so that radiant energy emanating from the melt surface passes through the aperture and is reflected by the mirror. The optical pyrometer is disposed to receive the reflected radiant energy.

These and other more detailed and specific objects will be disclosed in the course of the following specification, reference being had to the accompanying drawings, in which:

FIG. 1 is a vertical sectional view of the bell jar enclosure, illustrating the radiant energy path;

FIG. 2 is a horizontal sectional view of FIG. 1 apparatus taken along the line 2—2 in the direction of the arrows and illustrating the pivotable shutter means in closed or evaporating positions;

FIG. 3 is an isometric view of an enlarged scale of the shutter support member, the reflecting member, and its housing.

FIG. 4 is a top plan view on a slightly enlarged scale of a portion of a shutter member and attached housing illustrating apparatus for controllably altering the effective diameter of the shutter aperture.

The apparatus shown in FIG. 1 sets forth an embodiment of the present invention, and includes a base plate 12, supporting the bell jar 10, which with gasket member 11 form an enclosure or chamber adapted to be evacuated by any suitable vacuum pump (not shown) coupled to the apparatus via pipe 14. Conventionally the base plate is constructed of rigid material and the bell jar of glass. However, in this particular embodiment the bell jar is made of non-magnetic stainless steel and is provided with a glass observation port or window 46. The stainless steel not only provides a structurally strong bell jar but also prevents room or natural lighting from influencing light sensitive temperature measuring devices employed in the evaporative fabrication of thin films. If it were desirable to use a non-opaque glass bell jar, a curtain of non-reflective aluminum foil could be disposed upon the inner walls of the bell jar or darkened cloth could be draped over the outer walls of the bell jar for inhibiting any distorting effects that room or natural lighting may have on light sensitive temperature measuring devices. In either instance, of course, it would be necessary to provide a small aperture or the like for viewing the internal apparatus. It should also be noted that a darkening curtain does not have to enclose the entire bell jar, but may be limited to some specific area. For example, in the instant embodiment an annular sleeve-like darkening curtain could be vertically disposed within the bell jar between the shutter 32 and the base plate 12. In this case the widest diameter of the curtain would desirably be at least slightly less than the effective diameter of shutter 32. Lengthwise the annular curtain should extend at least to some point below the upper edge of crucible 18. Although reference has been made to an annular sleeve-like curtain no limitation to such a specific shape is intended.

The ferromagnetic source material or melt 16 to be melted, evaporated and subsequently condensed, is contained in the crucible 18, around which is a high frequency induction heating coil 20 for inductively heating the magnetic material 16. The crucible and RF work coil cooperate to form a treating means. Suitable containers other than crucibles may be employed to hold the melt and heating means other than an RF work coil may be employed to heat the melt. RF current for the induction heating may be supplied by an external generator 22. The power output of the generator is controlled either automatically or manually and the output may be continuously varied, for example, from 5% to 90% of maximum power.

Disposed in the upper portion of the bell jar is a substrate heater 24 provided with heating filaments 25. Beneath the heater and adjacent thereto is a holder 26 for holding a substrate 27 in a predetermined position. Various substrate materials may be used, the instant embodiment employing glass, and upon this glass substrate, in a designed manner, the evaporated material is allowed to condense. The substrate is normally heated to some elevated temperature and maintained at that temperature for at least the period of deposition. The mask 29 used for defining one or more films may also be held in contact with, or at a predetermined distance from the substrate 27 by holder 26. The holder, which also supports the substrate 27, may be held in any convenient manner, as by supports 28. The supports may also hold an electromagnet, or, as shown, a permanent magnet 30, the ends of which apply a field across the substrate to give the film or films deposited thereon an "easy" axis of magnetization, all as described in the aforementioned Rubens patent.

Generally the area occupied by the substrate 27 is greater than the area occupied by the melt surface. Therefore, a cone of increasing area projected from a point slightly above the melt surface to the substrate surface is employed to define the usable evaporant path. Further, the path of radiant energy emanating from the melt may be defined by a right cylinder projecting from the perimeter of the melt surface. The radiant energy path is generally indicated by the dotted lines shown in FIG. 1.

Between the magnetic material holder 18 and the substrate 27 is a shutter 32 pivotally attached to rod 34 for opening and closing the evaporation path. In the closed or first position, the shutter inhibits the deposition of material 16 upon the substrate 27 during heating and cooling intervals. FIG. 2 illustrates the positioning of the shutter when opening or closing the path, the closed position being shown in solid lines. Disposed above shutter 32 and mounted thereon by fastening means such as screws 52, is a canopy or housing device 50, best shown in FIG. 3, within which is located a reflecting or deflecting surface or front face mirror 44. Angularly disposed within and fastened to the inner walls of housing 50 are two opposing support arms 51, only one of which is shown in FIG. 3. The arms each extend sufficiently far from the walls, for example, one-sixteenth of an inch, to provide a supporting ledge for the mirror 44. The arms are disposed at a slightly less acute angle than that acute angle formed by the roof of the housing 50 for locating the mirror some distance from the rear of the housing, and also for providing easy insertion of the mirror member into the space provided between the supporting arms 51 and the roof portion of the housing 50.

The housing 50 is oriented above an aperture 45 in the shutter 32, the aperture being generally centrally located with respect to a vertical axis passing through the center of the melt 16. Both the shutter and housing are preferably fabricated from non-magnetic metallic material, such as stainless steel. Of course, the housing and shutter could be made of glass or the like, in which case it would be desirable that the glass be made opaque for excluding light emitted from sources other than melt material 16. As representative of dimension, no limitation intended, the distance between the upper edge of crucible 18 and the substrate 27 may be 18 inches, and the shutter is disposed approximately midway between these two mentioned components. Usually the diameter of the aperture 45 is slightly less than the diameter of the crucible 18. If it is desired, the diameter of the hole may be variably controlled by employing an iris arrangement such as is commonly used in cameras. Such an arrangement may take the form illustrated in FIG. 4 where there is seen a pair of pivotably movable leaves 47 and 47' of the type often employed in the construction of cameras. The leaves 47 and 47' are each provided with a slot 48 and 48' respectively, which slots exhibit a gradually diminishing width. The leaves are pivotably secured to the shutter 32 by the rivets or shafts 49—49 and the leaves are superimposed such that portions of the slots 48 and 48' coincide. As can be seen from the illustration, the point of coincidence is arranged to occur immediately above the aperture 45 in the shutter 32. When the leaves are rotated inwardly in the direction of the arrows, reduced diameter portions of the slots coincide above the aperture 45 and reduce the effective diameter of the aperture 45. Thus it can be seen that the diameter of the aperture 45 is adjustable and may be controllably varied for permitting only radiant energy emitted from selected portions of the melt material to be received by the reflecting means. By restricting the diameter of aperture 45 to some dimension less than the inside diameter of the crucible, radiant energy emanating from the perimeter of the melt where slag usually accumulates and from the crucible may be isolated and not received by the reflective surface disposed above the aperture. Shutter 32 is of sufficient planar area to prevent evaporant from being deposited onto the substrate while the shutter is positioned directly over the source material 16. The housing 50 is sufficiently large to prevent evaporant passing through the aperture 45 from depositing on other areas of the bell jar. The material employed to serve as the mirror 44 does not have to be reflective prior to its insertion into the housing, but should possess a relatively smooth finish, such that evaporant deposited onto the surface of the material forms a reflective surface. The mirror 44 utilized in the representative system is approximately 2 inches by 2 inches, and is angularly disposed within the housing 50, and centrally located with respect to aperture 45. The conventional cover glass commonly used for mounting slide films and measuring approximately 2 inches by 2 inches has been found to be a satisfactory basis material for the mirror and additionally presents the advantages of being uniform in size, possessing ground edges and is easily and cheaply obtained. However, the mirror need not be glass, but could be a suitable organic or inorganic material having a relatively smooth surface. Since it is an object of the housing or canopy 50 to prevent evaporant from escaping through the aperture 45 and shutter 32 onto other apparatus within the bell jar, no limitation is intended by the specific geometric configuration assigned the housing as illustrated in FIG. 3. Obviously, holder devices such as clamps may be mounted on shutter 32 in a manner to receive and dispose mirror 44 angularly and the mirror member could be made of such dimensional magnitude or geometric configuration as to prevent escape of evaporant. In the latter instance, the housing 50 would not be necessary. However, it has been concluded that for ease of maintenance and simplicity of construction, the employment of a housing or canopy is most satisfactory.

To determine the temperature of melt 16 while it is being heated by work coil 20, an optical pyrometer 58 is being heated by work coil 20, an optical pyrometer 58 is used. The pyrometer is located outside of the bell jar and in proximity to the window port 46. Optical pyrometers are commonly employed to ascertain the temperature of a heated material by sensing the radiant energy emitted by the material. The temperature measurement is generally made by comparing the light emitted from the heated object with light emitted from a previously calibrated heated wire filament located within the pyrometer. Indicated temperatures are directly related to the total amount of radiant energy emitted by the observed heated object.

In operation, the ferromagnetic material 16 is heated by applying power from the generator 22 to work coil 20 and raising the temperature of the ferromagnetic material above its melting point, for example, to a temperature of approximately 200° C. above the melting point of the material. This is done while the shutter 32 is disposed to intercept the evaporant path, thereby preventing vapor from condensing on the substrate, and after the bell jar chamber has been pumped down to a desirable pressure, for example $1 \times 10^{-7}$ mm. of mercury or less, and after the substrate has been heated to approximately 100° C. During the heating and melting of the ferromagnetic material, the pressure in the bell jar often rises, reaching a pressure in the $1 \times 10^{-6}$ mm. of mercury range as a result of outgassing and other effects. During this time the RF input current to the work coil 20 is carefully controlled to maintain the melt temperature as indicated by the optical pyrometer, near a desired evaporation temperature and in the allowable range thereof. This temperature, for most materials, is about 200° C. above the melting point. As was mentioned hereinbefore, several factors affect the total radiant energy sensed by a pyrometer. In order to obviate or limit the effect of factors influencing the total radiant energy sensed by the pyrometer, the optical axis of the sensing device is made perpendicular to a vertical axis passing through the center of the melt. The mirror or reflective surface 44 is located so that the intersection of the optical axis of the sensing device with the vertical axis passing through the center of the melt occurs at some point on the surface of the mirror. The mirror is angularly disposed such that the angle of incidence is approximately 45° and therefore equal to the angle of reflection. The mirror is located above the aperture in the shutter 32 and radiant energy emanating from the surface of the melt from the approximate center thereof passes through the aperture in the shutter 32 and is reflected by the mirror 44. The reflected radiant energy is sensed by pyrometer 58 which provides a related temperature reading. As was mentioned before, the diameter of the aperture shutter 32 is less than the inside diameter of the crucible in order to avoid observation of radiant energy being reflected either by the sides of the crucible or slag accumulated along the melt periphery. The radiant energy path described by the dotted lines on FIG. 1 reveals that only radiant energy being emitted from the center of the melt surface is reflected by the mirror. Thus it is seen that by locating the mirror directly above the melt and by limiting the diameter of the aperture in the shutter 32, several of the factors distorting the radiant energy measurement of the melt material 16 are obviated. By removing these influencing variable factors, true temperature measurements of the source material may be made.

Since it is true that the temperature of the molten material or melt at the time deposition is allowed to occur affects certain magnetic characteristics of the end product, it is important that vapor deposition be allowed to occur only while the melt temperature is within some specific range. If this specific or allowable temperature range is broad, variations in magnetic characteristics of the end product will result. By using the invention herein described, the temperature range is significantly narrowed, and the temperature may be accurately ascertained in a repeatable manner. The selection of a particular temperature which one may use depends on the characteristics desired for the deposited film and the type of melt material employed. However, a temperature may be selected within a range, the maximum point of which is that temperature determined by the physical limitations of the crucible 18. For crucibles presently available, 1800° C. is about the maximum. Beyond that temperature the crucible may crack or otherwise contaminate the melt, but a higher temperature may be employed where a particular crucible used will allow such. For permalloy, which contains, for example, 75% to 85% nickel, the remainder iron, the lower evaporation temperature is in the range of 1500° C.

When the desired evaporation temperature is first reached, shutter 32 is maintained closed for a given length of time, for example, from 2 to 10 minutes, the RF input is controlled to maintain the melt substantially at this temperature to stabilize the melt temperature, and the pressure of the bell jar is maintained at less than $5 \times 10^{-7}$ mm. of mercury. The time required to outgas the melt and stabilize or equilibrate the melt temperature throughout the melt is determined by the temperature at which the melt is maintained. For temperatures in the lower portion of the allowable temperature evaporation range, the stabilizing time required is less than that for temperatures in the upper part of the range. Generally, for most materials, a range of from 5 to 7 minutes is required to stabilize the melt temperature. While the shutter is in a closed position, no evaporated material is deposited on the substrate, but the metal evaporant leaving the crucible is trapped or deposited on the underside of shutter 32 or passes through aperture 45 and deposits on the mirror 44 and the inside of housing 50. The material depositing on the mirror 44 continuously forms the reflective surface. Thus, immediately after the initial deposition on the mirror surface, temperature readings may be taken. If the deposit is smooth the formed mirror may be used again. Usually the mirror formed by condensate from the source may be used for several runs, after which it may be turned over and the opposite side used. If it is desired that temperature readings be taken before any evaporation takes place, the mirror may be initially prepared with reflective surfaces.

Metal films deposited while employing a mirror 44 to reflect radiant energy to aid in ascertaining the true temperature of the melt, have exhibited more uniform properties than those produced without such a mirror. For example, in thin magnetic metal films, the coercivity and anisotropy fields exhibit a degree of uniformity not evident when thin films are deposited in the absence of a mirror. This uniformity of magnetic properties is not only exhibited between the magnetic films resulting from one run or cycle (when several are deposited at a time) but it also occurs from one run to the next. It is believed that this uniformity is a result of the accurate temperature measurements made possible by use of a mirror or reflective surface which excludes variable factors influencing the total radiant energy observed by a sensing device such as the pyrometer.

When the desired melt temperature has been reached, the shutter is rotated about support 34 and removed from the evaporant path. The mirror being mounted on the shutter is at the same time removed from the evaporant path and it is seen, therefore, that this reflecting device has been added to the apparatus already within the bell jar without impeding the evaporant path.

When the shutter is removed from the evaporant path, evaporant condenses upon the substrate 27 in selected areas defined by the mask 29. After the desired amount of evaporant has formed on the substrate, the shutter is rotated to again intercept the evaporant path and prevent further deposition upon the substrate.

Another advantage in using the mirror member in the manner herein described is the ease with which it may be removed when peeling or the like prohibits its continued use as a reflective surface. A minimum of shutdown time and skill is required to extract a peeling mirror and replace it.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. In apparatus for vapor depositing material on a substrate member, the combination comprising: means forming an evacuatable enclosure; support means disposed in said enclosure for retaining a substrate member; treating means in said enclosure and spaced from a substrate member retained by said support means for holding and evaporating material as evaporant onto a substrate so retained; shutter means having an aperture and being movably disposed with one position being intermediate a substrate so retained and said treating means to inhibit the deposit of said evaporant onto a substrate retained by said support means; reflecting means supported on said shutter means and disposed adjacent the aperture for reflecting radiant energy emanating from said material and passing through the aperture; and detector means arranged to receive substantially only the radiation reflected from said reflecting means for indicating the temperature of said material.

2. Aparatus as in claim 1 wherein said reflecting means is disposed in an opaque housing.

3. Apparatus as in claim 1 wherein said reflecting means is made of coated glass.

4. Apparatus as in claim 1 wherein said reflecting means is made of polished metal.

5. Aparatus as in claim 1 wherein said reflecting means is disposed such that the angle of reflecting of the material-emitted light is substantially 45°.

6. Apparatus as in claim 1 wherein said reflecting means is formed by the deposit of vapors arising from said material.

7. Apparatus as in claim 1 wherein said means forming an evacuatable enclosure is substantially opaque.

8. Apparatus as in claim 1 including means for inhibiting the transmission of light into said enclosure from light sources external thereto.

9. Apparatus as in claim 1 wherein the diameter of said aperture is adjustable.

10. In apparatus for fabricating at least one bistable magnetic film comprising means forming an evacuatable chamber, a substrate member disposed in said chamber, means disposed in said chamber and spaced below said substrate for holding ferromagnetic material, means for causing said material to emit radiant energy and for evaporating said material from said holding means onto said substrate as a film deposit; the improvement comprising in combination: shutter means movably disposed in the chamber and having one position between said substrate and said holding means to inhibit the deposition of the evaporating material onto said substrate, and having an aperture such that when in the one position radiant energy emanating from a preselected area portion of said material passes therethrough; reflecting means fixedly attached to said shutter means above said aperture for reflecting the preselected energy portion; and radiant energy sensing means disposed to receive only said reflected radiant energy.

11. A device as in claim 9 wherein the reflecting means is situated along a line which is substantially normal to the surface of said material and is disposed substantially at an angle of 45° to said line.

12. In apparatus for vapor depositing material on a substrate member, the combination comprising:
 (a) means forming an evacuatable enclosure;
 (b) support means disposed in said enclosure for retaining a substrate member;
 (c) treating means in said enclosure and spaced from a substrate member retained by said support means for holding and evaporating material as evaporant onto a substrate so retained;
 (d) shutter means having an aperture and being movably disposed within said enclosure and having first and second positions, the first position being intermediate a substrate so retained and said treating means to inbihit the deposit of said evaporant onto a substrate retained by said support means;
 (e) reflecting means movably disposed between said support means and said shutter means and having first and second positions, the first position of said reflecting means being such that the reflecting means is arranged adjacent said aperture when said shutter means is disposed in the first shutter means position for reflecting radiant energy emanating from said material and passing through said aperture;
 (f) and detector means arranged to receive substantially only the radiation reflected from said reflecting means for indicating the temperature of said material.

13. Apparatus as in claim 12 wherein movement of said shutter means from its first position to its second position is effective to move said reflecting means from its first position to its second position.

14. Apparatus as in claim 13 wherein said shutter means and said reflecting means move from their respective first positions to their respective second positions substantially concurrently.

15. In apparatus for vapor depositing material, the combination comprising:
 (a) means forming an evacuatable encolsure;
 (b) support means disposed in said enclosure for retaining a substrate member;
 (c) treating means in said enclosure and spaced from said support means for holding and evaporating material as evaporant which evaporant moves toward said support means;
 (d) shutter means having an opening therethrough and being disposed between said treating means and said support means, said shutter means being movable between first and second positions, the shutter being effective when in said first position to intercept a major portion of the evaporant moving toward said support means while permitting a minor portion of the evaporant to pass through said opening;
 (e) reflecting means disposed between the shutter means and the support means for intercepting that portion of the evaporant passing through said opening and reflecting radiant energy emanating from said material and passing through said opening;
 (f) and detector means arranged to receive substantially only the radiation reflected from said reflecting means for indicating the temperature of said material.

16. In apparatus for vapor depositing material, the combination comprising:
 (a) means forming an evacuatable enclosure;
 (b) support means disposed in said encolsure for retaining a subtrate member;
 (c) treating means in said enclosure and spaced from said support means for holding and evaporating material;

(d) shutter means having an aperture and being disposed between said treating means and said support means, said shutter means being movable and having a first position wherein the shutter is effective to intercept evaporant moving toward said support means;

(e) reflecting means disposed between said shutter means and said support means for reflecting radiant energy emanating from said material and passing through said apreture when said shutter is in said first position;

(f) and detector means arranged to receive substantially only the radiation reflected from said reflecting means for indicating the temperature of said material.

References Cited in the file of this patent

UNITED STATES PATENTS

| | | |
|---|---|---|
| 2,746,420 | Steigerwald | May 22, 1956 |
| 2,840,146 | Ray | June 24, 1958 |
| 2,900,282 | Rubens | Aug. 18, 1959 |
| 2,912,351 | Danner et al. | Nov. 10, 1959 |
| 3,013,467 | Minsky | Dec. 19, 1961 |
| 3,018,198 | Olson et al. | Jan. 23, 1962 |

FOREIGN PATENTS

| | | |
|---|---|---|
| 656,151 | Germany | Jan. 29, 1938 |